(12) United States Patent
Gupta

(10) Patent No.: US 11,803,358 B1
(45) Date of Patent: Oct. 31, 2023

(54) ADAPTIVE ISSUE TYPE IDENTIFICATION PLATFORM

(71) Applicants: ATLASSIAN PTY LTD., Sydney (AU); ATLASSIAN US, INC., San Francisco, CA (US)

(72) Inventor: Rahul Gupta, Telangana (IN)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/936,635

(22) Filed: Sep. 29, 2022

(51) Int. Cl.
 *G06F 8/38* (2018.01)
 *G06Q 10/10* (2023.01)
(52) U.S. Cl.
 CPC .............. *G06F 8/38* (2013.01); *G06Q 10/103* (2013.01)
(58) Field of Classification Search
 None
 See application file for complete search history.

(56) References Cited

U.S. PATENT DOCUMENTS

| | | | |
|---|---|---|---|
| 11,556,225 B1* | 1/2023 | Romagnoli .... | G06Q 10/063114 |
| 2012/0072229 A1* | 3/2012 | Zaldivar, Jr ......... | G06Q 30/016 |
| | | | 705/1.1 |
| 2020/0104125 A1* | 4/2020 | Pechacek ................. | G06F 8/71 |
| 2020/0110647 A1* | 4/2020 | Souche ............... | G06F 11/0709 |
| 2020/0151287 A1* | 5/2020 | McCool ................. | G06Q 10/08 |
| 2021/0224818 A1* | 7/2021 | Choudhary ......... | G06F 16/3329 |
| 2022/0100734 A1* | 3/2022 | Geeves ................. | G06F 16/219 |
| 2022/0207050 A1* | 6/2022 | Awadhwal .......... | G06F 16/3344 |
| 2023/0017471 A1* | 1/2023 | Cooper ................... | G06F 9/542 |
| 2023/0101264 A1* | 3/2023 | Baskar .................. | G06Q 10/20 |
| | | | 705/7.18 |

* cited by examiner

*Primary Examiner* — Toan H Vu
(74) *Attorney, Agent, or Firm* — ALSTON & BIRD LLP

(57) ABSTRACT

Embodiments provide an adaptive issue type identification platform for automatically determining an issue type in an enterprise-level software development issue-tracking application. Embodiments include receiving a request to generate an issue data object, causing initializing of the issue data object in a data store, causing display of an issue management capability selection interface, and receiving issue capability selection input in response to user engagement with the issue management capability selection interface. In response to receiving the issue capability selection input, the adaptive issue type identification platform fetches an operational capability set from a capability registry based on the issue capability selection input, causes the association of the operational capability set to the issue data object at the data store, determines an issue type identifier for the issue data object based on the operational capability set, and updates metadata associated with the issue data object to include the issue type identifier.

20 Claims, 5 Drawing Sheets

500

COMPUTE, VIA A CAPABILITY SET SERVICE COMPONENT, RELEVANCE SCORES FOR ONE OR MORE OPERATIONAL CAPABILITY SETS STORED IN THE CAPABILITY REGISTRY, WHEREIN THE RELEVANCE SCORES ARE BASED IN PART ON HISTORICAL USAGE OF THE RESPECTIVE ONE OR MORE OPERATIONAL CAPABILITY SETS
502

RANK, BASED ON THE RELEVANCE SCORES, EACH OF THE ONE OR MORE OPERATIONAL CAPABILITY SETS SUCH THAT OPERATIONAL CAPABILITY SETS WITH A HIGHER RESPECTIVE RELEVANCE SCORE ARE DISPLAYED ON THE ISSUE MANAGEMENT CAPABILITY SELECTION INTERFACE IN A POSITION OF HIGHER PROMINENCE RELATIVE TO THE OPERATIONAL CAPABILITY SETS WITH LOWER RESPECTIVE RELEVANCE SCORES
504

STORE, IN THE CAPABILITY REGISTRY, THE RELEVANCE SCORES AND RANKS OF EACH OF THE ONE OR MORE OPERATIONAL CAPABILITY SETS
506

*FIG. 5*

ADAPTIVE ISSUE TYPE IDENTIFICATION PLATFORM

TECHNICAL FIELD

Embodiments of the present disclosure are generally directed to software development, collaboration, and issue-tracking tools for enterprise-level software development teams.

BACKGROUND

Software developers and other users employ issue-tracking tools for managing tasks and resolving alerts, errors, incidents, or problems during the development, delivery, execution, debugging, incident identification, troubleshooting, and/or operation of software. Applicant has discovered various technical problems associated with conventional issue-tracking tools. Through applied effort, ingenuity, and innovation, Applicant has solved many of these identified problems by developing the embodiments of the present disclosure, which are described in detail below.

BRIEF SUMMARY

In one aspect, a computer-implemented method for managing an issue workflow in an issue management system includes receiving, via an adaptive issue type rendering system, a request to generate an issue data object, where the request is generated in response to an interaction with an interactive issue creation interface. The computer-implemented method also includes causing initializing of the issue data object in a data store. The computer-implemented method also includes causing display, via the interactive issue creation interface, of an issue management capability selection interface. The computer-implemented method also includes receiving issue capability selection input in response to user engagement with the issue management capability selection interface and, in response to receiving the issue capability selection input, fetching an operational capability set from a capability registry based on the issue capability selection input as well as causing association of the operational capability set to the issue data object at the data store. The computer-implemented method also includes determining, via an issue type identification service component, an issue type identifier for the issue data object based on the operational capability set, and updating metadata associated with the issue data object to include the issue type identifier.

The computer-implemented method further includes computing, via a capability set service component, relevance scores for one or more operational capability sets stored in the capability registry, where the relevance scores are based in part on historical usage of the respective one or more operational capability sets. The computer-implemented method also includes ranking, based on the relevance scores, each of the one or more operational capability sets such that operational capability sets with a higher respective relevance score are displayed on the issue management capability selection interface in a position of higher prominence relative to the operational capability sets with lower respective relevance scores. The computer-implemented method also includes storing, in the capability registry, the relevance scores and ranks of the one or more operational capability sets.

The computer-implemented method further includes where the capability registry comprises one or more operational capability sets, where the one or more operational capability sets comprise one or more operational capabilities, and where the one or more operational capabilities can be one of at least a personnel connection to the issue data object, an issue classification label associated with the issue data object, or a workforce collaboration tool interfaced by the issue management system.

The computer-implemented method further includes where the issue type identification service component employs static rules, heuristics, and learned knowledge to determine the issue type identifier for the issue data object based on the operational capability set, where the learned knowledge comprises prior rankings and relevance scores for the operational capability sets stored in the capability registry, as well as metadata associated with one or more past issue data objects stored in the data store.

The computer-implemented method further includes where the issue management system further comprises a predictive machine learning model derived from a training dataset, and where the predictive machine learning model works in conjunction with the issue type identification service component and the capability set service component.

The computer-implemented method further includes where the predictive machine learning model employs the learned knowledge of the issue type identification service component as a portion of the training data set. The computer-implemented method also includes predicting, via the predictive machine learning model, an issue type identifier upon generation of a new issue data object.

The computer-implemented method further includes filtering, via the capability set service component, historically unused operational capability sets such that the historically unused operational capability sets are not displayed on the issue management capability selection interface.

The computer-implemented method further includes where the issue management capability selection interface comprises a plurality of interactive operational capability components, where the interactive operational capability components are a visual representation of one or more operational capabilities, and where receiving the issue capability selection input further comprises receiving a selection indication associated with one or more interactive operational capability components.

In one aspect, an apparatus for managing an issue workflow in an issue management system includes at least one processor. The apparatus also includes at least one memory storing instructions that, when executed by the at least one processor, cause the apparatus to receive, via an adaptive issue type rendering system, a request to generate an issue data object, where the request is generated in response to an interaction with an interactive issue creation interface. The apparatus also includes at least one memory storing instructions that, when executed by the at least one processor, cause the apparatus to cause initializing of the issue data object in a data store. The apparatus also includes at least one memory storing instructions that, when executed by the at least one processor, cause the apparatus to cause display, via the interactive issue creation interface, of an issue management capability selection interface. The apparatus also includes at least one memory storing instructions that, when executed by the at least one processor, cause the apparatus to receive issue capability selection input in response to user engagement with the issue management capability selection interface and, in response to receiving the issue capability selection input, fetch an operational capability set from a capability registry based on the issue capability selection input as well as causing association of the operational capability set to the issue data object at the data store. The apparatus also includes at least one memory storing instructions that, when executed by the at least one processor, cause the apparatus to determine, via an issue type identification service component, an issue type identifier for the issue data object based on the operational capability set, and update metadata associated with the issue data object to include the issue type identifier.

The apparatus may also include where the instructions further cause the apparatus to compute, via a capability set service component, relevance scores for one or more operational capability sets stored in the capability registry, where the relevance scores are based in part on historical usage of the respective one or more operational capability sets. The apparatus may also include where the instructions further cause the apparatus to rank, based on the relevance scores, each of the one or more operational capability sets such that operational capability sets with a higher respective relevance score are displayed on the issue management capability selection interface in a position of higher prominence relative to the operational capability sets with lower respective relevance scores. The apparatus may also include where the instructions further cause the apparatus to store, in the capability registry, the relevance scores and ranks of the one or more operational capability sets.

The apparatus may also include where the capability registry comprises one or more operational capability sets, where the one or more operational capability sets comprise one or more operational capabilities, and where the one or more operational capabilities can be one of at least a personnel connection to the issue data object, an issue classification label associated with the issue data object, or a workforce collaboration tool interfaced by the issue management system.

The apparatus may also include where the issue type identification service component employs static rules, heuristics, and learned knowledge to determine the issue type identifier for the issue data object based on the operational capability set, where the learned knowledge comprises prior rankings and relevance scores for the operational capability sets stored in the capability registry, as well as metadata associated with one or more past issue data objects stored in the data store.

The apparatus may also include where the issue management system further comprises a predictive machine learning model derived from a training dataset, and where the predictive machine learning model works in conjunction with the issue type identification service component and the capability set service component.

The apparatus may also include where the predictive machine learning model employs the learned knowledge of the issue type identification service component as a portion of the training data set. The apparatus may also include where the instructions further cause the apparatus to predict, via the predictive machine learning model, an issue type identifier upon generation of a new issue data object.

The apparatus may also include where the instructions further cause the apparatus to filter, via the capability set service component, historically unused operational capability sets such that the historically unused operational capability sets are not displayed on the issue management capability selection interface.

The apparatus may also include where the issue management capability selection interface comprises a plurality of interactive operational capability components, where the interactive operational capability components are a visual representation of one or more operational capabilities, and where the instructions to receive the issue capability selection input further cause the apparatus to receive a selection indication associated with one or more interactive operational capability components.

In one aspect, a non-transitory computer-readable storage medium for managing an issue workflow in an issue management system, the computer-readable storage medium including instructions that when executed by at least one processor, cause the at least one processor to receive, via an adaptive issue type rendering system, a request to generate an issue data object, where the request is generated in response to an interaction with an interactive issue creation interface. The non-transitory computer-readable storage medium also includes instructions to cause initializing of the issue data object in a data store. The non-transitory computer-readable storage medium also includes instructions to cause the apparatus to cause display, via the interactive issue creation interface, of an issue management capability selection interface. The non-transitory computer-readable storage medium also includes instructions to receive issue capability selection input in response to user engagement with the issue management capability selection interface and, in response to receiving the issue capability selection input, fetch an operational capability set from a capability registry based on the issue capability selection input as well as causing association of the operational capability set to the issue data object at the data store. The non-transitory computer-readable storage medium also includes instructions to determine, via an issue type identification service component, an issue type identifier for the issue data object based on the operational capability set, and update metadata associated with the issue data object to include the issue type identifier.

The non-transitory computer-readable storage medium may also include where the instructions further cause the at least one processor to compute, via a capability set service component, relevance scores for one or more operational capability sets stored in the capability registry, where the relevance scores are based in part on historical usage of the respective one or more operational capability sets. The non-transitory computer-readable storage medium may also include where the instructions further cause the at least one processor to rank, based on the relevance scores, each of the one or more operational capability sets such that operational capability sets with a higher respective relevance score are displayed on the issue management capability selection interface in a position of higher prominence relative to the operational capability sets with lower respective relevance scores. The non-transitory computer-readable storage medium may also include where the instructions further cause the at least one processor to store, in the capability registry, the relevance scores and ranks of the one or more operational capability sets.

The non-transitory computer-readable storage medium may also include where the capability registry comprises one or more operational capability sets, where the one or more operational capability sets comprise one or more operational capabilities, and where the one or more operational capabilities can be one of at least a personnel connection to the issue data object, an issue classification label associated with the issue data object, or a workforce collaboration tool interfaced by the issue management system.

The non-transitory computer-readable storage medium may also include where the issue type identification service component employs static rules, heuristics, and learned knowledge to determine the issue type identifier for the issue data object based on the operational capability set, where the learned knowledge comprises prior rankings and relevance scores for the operational capability sets stored in the capability registry, as well as metadata associated with one or more past issue data objects stored in the data store.

BRIEF DESCRIPTION OF THE SEVERAL VIEWS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. To easily identify the discussion of any particular element or act, the most significant digit or digits in a reference number refer to the figure number in which that element is first introduced.

FIG. 5 illustrates a flowchart representing a process 500 for computing relevance scores and ranking respective operational capability sets in a capability registry in accordance with one or more embodiments of the present disclosure.

DETAILED DESCRIPTION

Figure 1:
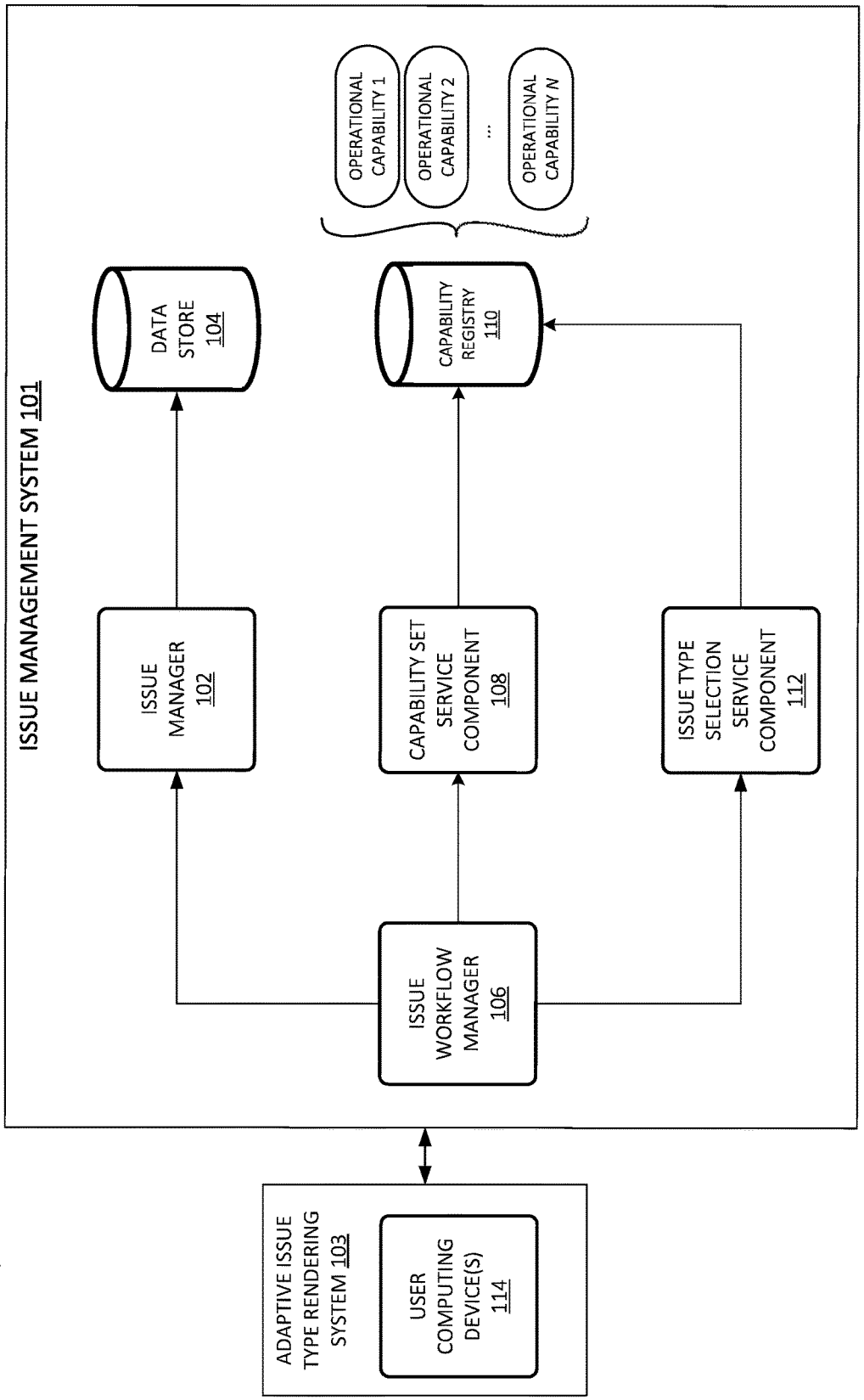
FIG. 1 is a block diagram of an exemplary adaptive issue type identification platform architecture configured for adaptive issue type identification in accordance with one or more embodiments of the present disclosure.

Various embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. The terms "illustrative," "example," and "exemplary" are used to be examples with no indication of quality level. Like numbers refer to like elements throughout.

OVERVIEW

Issue-tracking tools are useful for agile project management teams, software developers, and other enterprise users for managing tasks and resolving alerts, errors, incidents, or problems during the development, delivery, execution, debugging, incident identification, troubleshooting, and/or operation of software. As issues are created by users, the users are required to select an issue type for the issue that is tied to certain predefined operational capabilities within the issue-tracking system.

Unfortunately, as tasks are completed involving the issue and the contextual environment around the issue otherwise matures, users may find that they require operational capabilities within the issue-tracking system that are not available to the originally selected issue type. Said differently, putting the impetus on users to manually select an issue type at issue creation can "funnel" users to operational capability restrictions and unhelpful workflows that reduce the efficiency of the system and impede the effectiveness of the users.

Embodiments of the present disclosure provide for systems, apparatuses, computer-implemented methods, and computer program products that are configured for adaptively determining an issue type and associating the determined issue type with an issue data object at an appropriate time during an issue life cycle (i.e., not necessarily at issue data object creation). Various embodiments are directed to an issue management system that is configured to initiate an issue workflow by receiving a request to generate an issue data object associated with an issue. The request can be generated in response to a user interaction with an interactive issue creation interface associated with an adaptive issue type rendering system that integrates with the issue management system.

The issue management system embodies and/or integrates with various non-transitory data stores that comprise all the operational capabilities available to a user. As such, a list of interactive operational capability components associated with all the respective operational capabilities available to the user can be rendered for selection on an issue management capability selection interface displayed by the issue creation interface. As interactive operational capability components are selected via the issue management capability selection interface, metadata related to the operational capabilities associated with the operational capability components is added to the newly created issue data object. In some embodiments, as the metadata associated with the selected operational capabilities is added to the issue data object, a predictive model is employed by the issue management system to classify the issue with an appropriate issue type identifier.

Various issue type identifiers include, but are not limited to, incident, problem, change, service request, task, post-incident review, and service request with approvals. Additionally, each issue type identifier is associated with a particular set of operational capabilities. Operational capabilities comprise personnel connections to the issue such as assignee, reporter, stakeholder, and responder; issue classification labels such as request type, priority, and severity; and workforce collaboration tools used to create timelines, build team chat channels, schedule conference calls, link assets to the issue, automate the issue workflow, and/or create alerts. Currently, an issue type identifier which is associated with a specific grouping of operational capabilities must be selected by a user, potentially limiting access to a desired capability based on an incorrect issue type identification. However, embodiments of the present disclosure employ an issue type identification service component within an issue management system to predictively classify the issue type based on a selection of operational capabilities.

The issue management system comprises an issue manager, a data store, an issue workflow manager, a capability set service, a capability registry, and an issue type identification service component. The issue manager can create, retrieve, update, and/or delete issue data objects in the data store. Additionally, the issue manager correctly stores and updates all metadata related to the issue data objects in the data store. In various embodiments, the metadata comprises the issue type (e.g., an issue type identifier) and any metadata associated with the selected operational capabilities. Once an issue data object is created and a particular group of operational capabilities is selected, the issue workflow manager can fetch metadata associated with the issue data object, fetch the selected set of operational capabilities, and/or identify an issue type based on the selected set of operational capabilities. Additionally, all available operational capabilities are stored and maintained in the capability registry such that whenever the issue management system is updated to include new operational capabilities, they are added to the capability registry.

In various embodiments, once a request to create a new issue data object is generated in response to a user interaction with the issue creation interface, the issue workflow manager exposes an initial set of operational capabilities based on a generic issue type. For this purpose, an issue management capability selection interface comprising interactive operational capability components associated with the initial set of operational capabilities can be displayed via the issue creation interface. For example, when a new issue data object is created, the issue workflow manager can fetch metadata from the issue manager based on a generic issue type and display a set of predetermined operational capabilities on the issue management capability selection interface. In various embodiments, the issue management system adapts over time and a capability set service component works in conjunction with a predictive model to rank, filter, and associate a relevance score with each respective operational capability comprised in the capability registry based on the historical usage of each respective operational capability.

In various embodiments, once a set of operational capabilities has been selected for an issue data object associated with an issue, the issue workflow manager identifies the issue's type and updates, by way of the issue manager, the metadata of the issue data object to include the issue type identifier. In one or more embodiments, the issue workflow manager calls on an issue type identification service component to automatically determine an issue type identifier for the corresponding issue data object. The issue type identification service component comprises static rules, heuristics, and learned knowledge from past issues. The learned knowledge comprises prior rankings and relevance scores for each respective operational capability stored in the capability registry, as well as past issue data objects and their associated metadata stored in data store. In various embodiments, the predictive model of the issue management system can use this learned knowledge as part of a training data set, and, in this way, predict or recommend an issue type upon creation of a new issue. The issue workflow manager can then update the metadata associated with the corresponding issue type in the data store.

In one or more embodiments, the predictive machine learning model is iteratively updated such that the more the issue management system is employed, the more accurate and efficient the issue management system becomes. For example, the more issues that are created and stored in data store, and the more operational capabilities that are selected, ranked and scored for relevance in capability registry, the larger the training data set for the predictive model will be. In this regard, improvements to computer efficiency are made by reducing the time and resources necessary to interpret and identify an issue type for any issue. Computational load and complexity are further reduced by avoiding unneeded operational steps or issue workflows that are conventionally triggered by a selection of erroneous issue types. Finally, the time, human resources, and cognitive load necessary to classify a particular issue and determine the appropriate operational capabilities needed to address the issue are also reduced.

"Issue data object" refers to a structured, electronically managed data object generated by an issue management system in response to a user interaction with an interactive issue creation interface accessible via a user computing device integrated with an adaptive issue type rendering system. An issue data object is associated with an issue workflow and is organized in a manner that makes it processable, storable, and/or otherwise interpretable by the one or more components of an issue management system. An issue data object comprises respective metadata comprising an issue type identifier, an operational capability set, and additional data associated with the operational capability set.

"Issue" refers to a technical task including, but not limited to, a process step, a software development task, an alert, a conflict, error, or problem in at least one of the development, delivery, execution, debugging, incident identification, troubleshooting, and/or operation of a piece of software.

"Issue workflow" refers to the lifecycle and timeline of an issue and comprises the necessary steps to document and successfully manage an issue and the issue's associated issue data object. In one or more embodiments, the issue workflow comprises an issue data object's creation and type identification, as well as data related to the resolution of the associated issue. Successful management of an issue workflow is reliant on proper classification of the issue and access to the appropriate operational capabilities with which to handle the issue.

"Issue management system" refers to computer-coded instructions, executable code, a selected service of federated service architecture, and/or a software application that is configured for execution via one or more computing device(s). The computing device(s) and its associated components facilitate the execution and management of an issue workflow. In one or more embodiments, the issue management system is configured to generate an issue workflow by receiving an issue description via an interactive issue creation interface, thereby initializing an issue data object in a data store. Issue capability selection input is received via an issue management capability selection interface of an adaptive issue type rendering system, and, in response, an operational capability set is fetched from a capability registry. The issue management system causes association of the operational capability set to the newly created issue data object and determines, via an issue type identification service component, an issue type identifier for the issue data object. Metadata associated with the issue data object is then updated to include the issue type identifier. In preferred embodiments, an issue management system comprises at least one data store and at least one capability registry and operates on one or more portions of executable code.

"Operational capability" refers to any method, function, procedure, computer-implemented process, and/or third-party software application performable via a particular computing device(s) or system(s) associated with one of at least: a personnel connection to an issue such as an assignee, a reporter, a stakeholder, and/or a responder; an issue classification label such as request type, priority, and/or severity; and/or a workforce collaboration tool used to create timelines, build team chat channels, schedule conference calls, link assets to the issue, automate the issue workflow, and/or create alerts associated with an issue workflow related to a respective issue. Some operational capabilities receive input and produce output based on that input. Non-limiting examples of an operational capability include an application programming interface (API) call, a method call, a procedure call of a local application, a remote procedure call, an interactive interface associated with a third-party application, creation and maintenance of a data object and the data object's associated metadata, and other execution of computer-coded instructions.

"Operational capability set" refers to any number of operational capabilities that are performable and can be associated with a particular issue data object. In some embodiments an operational capability set includes methods or functions of a particular instance of a data object. An issue type identification service component can determine an issue type identifier to associate with an issue data object based on an analysis of a related operational capability set.

"Capability registry" refers to any type of non-transitory computer-readable storage medium capable of storing, maintaining, and updating data associated with one or more operational capabilities.

"Issue type identifier" refers to a data attribute comprising identifying information associated with an issue data object being classified by an issue management system. An issue type identifier can be generated by an issue type identification component associated with an issue management system based on the issue type identification component's analysis of an operational capability set. The issue type identification component can, by way of an issue manager, store and/or update metadata associated with an issue type identifier for a particular issue data object.

"Adaptive issue type rendering system" refers to computer-coded instructions, executable code, a selected service of federated service architecture, and/or a software application that is configured for execution via one or more computing device(s). The adaptive issue type rendering system comprises an interactive issue creation interface and one or more user computing devices capable of interfacing with an issue management system. In various embodiments, the interactive issue creation interface is generated by the issue management system and rendered by the adaptive issue type rendering system. The adaptive issue type rendering system can generate issue data object initialization requests and/or issue capability selection input based on user interaction with the interactive issue creation interface. Once generated, the adaptive issue type rendering system can transmit the requests and/or issue capability selection input to the issue management system.

"Interactive issue creation interface" refers to an interactive interface generated by the adaptive issue type rendering system to be displayed on the visual display of a user computing device(s). In some embodiments, the interactive issue creation interface comprises one or more interactive display elements associated with one or more respective components of the issue management system such that an interaction with the one or more interactive display elements can cause the issue management system to receive and execute various commands. The adaptive issue type rendering system can generate a request to initialize an issue data object based on a user interaction with the interactive issue creation interface and transmit the request to the issue management system. In response to the request, an issue manager can employ executable code to initialize the issue data object in a data store.

"Issue management capability selection interface" refers to an interactive interface generated by the adaptive issue type rendering system to be displayed via the interactive issue creation interface. In some embodiments, the issue management capability selection interface comprises one or more interactive display elements associated with one or more respective components of the issue management system such that an interaction with the one or more interactive display elements can cause the issue management system to receive and execute various commands. Additionally or alternatively, the issue management capability selection interface can be configured to display a plurality of interactive operational capability components, where the interactive operational capability components are an interactive, visual representation of one or more operational capabilities stored in a capability registry. The adaptive issue type rendering system can generate issue capability selection input in response to a user interaction with the issue management capability selection interface, where the issue capability selection input can be a selection indication of one or more interactive operational capability components associated with one or more respective operational capabilities as presented on the issue management capability selection interface. The adaptive issue type rendering system can transmit the issue capability selection input to the issue management system such that an issue workflow manager can subsequently employ the capability set service component to retrieve an operational capability set associated with the issue capability selection input from a capability registry.

"Capability set service component" refers to executable code configured on one or more user computing devices to facilitate the retrieval of an operational capability set from a capability registry based on issue capability selection input. The capability set service component can compute relevance scores for each operational capability set in the capability registry based, in part, on the historical usage of the respective operational capability sets. Additionally, the capability set service component can rank each operational capability set in the capability registry based on the respective relevance scores of the operational capability sets. The capability set service component can store and/or update the respective relevance scores and ranks of the operational capability sets in the capability registry.

"Issue type identification service component" refers to executable code configured on one or more user computing devices to facilitate the determination of an issue type identifier for an issue data object based on an operational capability set. The issue type identification service component comprises static rules, heuristics, and learned knowledge with which to analyze the operational capability set. The issue type identification service component's analysis of the operational capability set results in a classification of an issue's type such that an issue type identifier is determined and associated with the issue data object related to the issue. In one or more embodiments, the learned knowledge comprised in the issue type identification service component comprises prior rankings and relevance scores for one or more operational capability sets stored in a capability registry, as well as data related to past issue workflows and the respective issue data objects and metadata related to the past issue workflows. The issue workflow manager can fetch, update, and store data related to the learned knowledge comprised in the issue type identification service component.

"Issue manager" refers to executable code configured on one or more computing devices to facilitate the generation of new issue data objects and the subsequent storing of the issue data objects in a data store. The issue manager works in conjunction with the issue workflow manager to fetch, update, and store metadata associated with the issue data objects stored in the data store.

"Issue workflow manager" refers to executable code configured on one or more computing devices to facilitate the fetching, updating, and storing of metadata associated with issue data objects, and works in conjunction with the issue manager. The issue workflow manager can employ the capability set service component and the issue type identification service component to complete various operations. For example, the issue workflow manager, by way of the capability set service component, can associate an operational capability set with an issue data object. Additionally, the issue workflow manager, by way of the issue type identification service component, can associate an issue type identifier with an issue data object.

"Computing device" refers to any computer, processor, circuitry, and/or other executor of computer instructions that is embodied in hardware, software, firmware, and/or any combination thereof. Non-limiting examples of a computing device include a computer, a processor, an application-specific integrated circuit, a field-programmable gate array, a personal computer, a smart phone, a laptop, a fixed terminal, a server, a networking device, and a virtual machine.

"User computing device" refers to a computing device associated with a person, company, or other organizational structure that controls one or more systems. In some embodiments, a user computing device is associated with particular administrative credentials that define access to operation via a particular system.

"Executable code" refers to a portion of computer program code stored in one or a plurality of locations that is executed and/or executable via one or more computing devices embodied in hardware, software, firmware, and/or any combination thereof. Executable code defines at least one particular operation to be executed by one or more computing devices. In some embodiments, a memory, storage, and/or other computing device includes and/or otherwise is structured to define any amount of executable code (e.g., a portion of executable code associated with a first operation and a portion of executable code associated with a second operation). Alternatively or additionally, in some embodiments, executable code is embodied by separate computing devices (e.g., a first data store embodying first portion of executable code and a second data store embodying a second portion executable code).

"Data store" refers to any type of non-transitory computer-readable storage medium. Non-limiting examples of a data store include hardware, software, firmware, and/or a combination thereof capable of storing, recording, updating, retrieving and/or deleting computer-readable data and information.

"Data attribute" refers to electronically managed data representing a variable or particular criteria or property having a particular value or status. The value may be statically fixed or dynamically assigned. In some embodiments, a data attribute embodies a particular property of a data object.

"Data value" refers to electronically managed data representing a particular value for a particular data attribute.

"Metadata" refers to a collection of one or more data attributes associated with a data object such as an issue data object.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment). The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

EXAMPLE SYSTEMS, APPARATUSES, AND DATA FLOWS OF THE DISCLOSURE

FIG. 1 illustrates an exemplary adaptive issue type identification platform architecture 100 for performing adaptive issue type identification. The exemplary adaptive issue type identification platform architecture 100 comprises an issue management system 101 and an adaptive issue type rendering system 103. The issue management system 101 comprises an issue manager 102, a data store 104, an issue workflow manager 106, a capability set service component 108, a capability registry 110, and an issue type identification service component 112. In some embodiments, the adaptive issue type rendering system 103 comprises one or more user computing device(s) 114.

The adaptive issue type rendering system 103 and the issue management system 101 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Web Socket channel. In some embodiments, the protocol is JSON over RPC, JSON over REST/HTTP, and the like.

In one or more embodiments, the user computing device(s) 114 includes or is embodied by one or more user computing device(s), for example a smartphone, tablet, personal computer, laptop, and/or the like. The user computing device(s) 114 may be configured to store, access, or maintain one or more components of the issue management system 101, for example via one or more processor(s), non-transitory storage device(s), and/or communications circuitry(s) of the user computing device(s) 114. In some embodiments, the user computing device(s) 114 includes or is embodied in a single user computing device or plurality of interacting user computing devices. In other embodiments, the user computing device(s) 114 includes a plurality of user computing devices associated with a single user or a plurality of users, where a user can be a person, company, or other organizational structure.

The adaptive issue type rendering system 103 can be configured to cause the issue manager 102 to employ one or more portions of executable code to create, retrieve, update, and/or delete one or more issue data objects associated with an issue in the data store 104 (e.g., in response to a user interaction with the user computing device(s) 114). Additionally, in some embodiments, the issue manager 102 can store and/or update any metadata related to the respective one or more issue data objects in the data store 104. The metadata associated with the one or more issue data objects comprises an issue type (e.g., an issue type identifier) and any metadata associated with any selected operational capability sets associated with the issue data object. The issue manager 102 can be configured to work in conjunction with the issue workflow manager 106 to fetch, update, and store metadata associated with the issue data objects stored in the data store 104. In one or more embodiments, the data store 104 can be any type of non-transitory computer-readable storage medium including, but not limited to, hardware, software, firmware, and/or a combination thereof capable of storing, recording, updating, retrieving and/or deleting computer-readable data and information.

The issue workflow manager 106 can employ executable code configured on one or more user computing device(s) 114 to facilitate the fetching, updating, and storing of metadata associated with one or more issue data objects, and works in conjunction with the issue manager 102. The issue workflow manager 106 is also configured to employ the capability set service component 108 and the issue type identification service component 112 to complete various operations. For example, the issue workflow manager 106, by way of the capability set service component 108, can associate an operational capability set with an issue data object. Additionally, the issue workflow manager 106, by way of the issue type identification service component 112, can associate an issue type identifier with an issue data object by directing the issue manager 102 to update the respective metadata of said issue data object in the data store 104.

In various embodiments, once an issue data object is created by the issue manager 102 and a particular set of operational capabilities is selected via an issue creation interface, the issue workflow manager 106 can automatically fetch metadata associated with the issue data object, fetch the selected set of operational capabilities, and/or associate an issue type with a respective issue data object based on the selected set of operational capabilities. Additionally or alternatively, in some embodiments, once a new issue data object is created by the issue manager 102, the issue workflow manager 106 exposes (e.g., via an interactive issue creation interface) an initial set of operational capabilities based on a generic issue type. For example, when a new issue data object is created via an interactive issue creation interface, the issue workflow manager 106 fetches metadata, by way of the issue manager 102, from the data store 104 based on a generic issue type and displays a set of relevant operational capabilities on the interactive issue creation interface. In various embodiments, the relevant operational capabilities related to the generic issue type are based on a particular user computing device(s) 114 historical usage of said relevant operational capabilities.

The issue workflow manager 106 can direct the capability set service component 108 to facilitate the retrieval of one or more operational capability sets from the capability registry 110 based on issue capability selection input. The issue capability selection input can be generated by the adaptive issue type rendering system 103 in response to a user interaction with an issue management capability selection interface of a user computing device (e.g., user computing device 114). The capability set service component 108 can receive the issue capability selection input and fetch the one or more operational capability sets from the capability registry 110 based on said issue capability selection input. The capability set service component 108 can be configured to compute relevance scores for each of the one or more operational capability sets in the capability registry 110 based, in part, on the historical usage of each of the one or more respective operational capability sets. Additionally, the capability set service component 108 can rank each of the one or more operational capability sets in the capability registry 110 based on the respective relevance scores of the operational capability sets. The capability set service component 108 can also store and/or update the respective relevance scores and ranks of the operational capability sets in the capability registry 110. Additionally or alternatively, in various embodiments, the capability set service component 108 can filter the one or more operational capability sets in the capability registry 110 such that when the operational capability sets are fetched by the issue workflow manager 106 from the capability registry 110, only relevant operational capability sets that match certain criteria are made available. It will be appreciated that all available operational capabilities are stored and maintained in the capability registry 110 such that whenever the issue management system 101 is updated to include new operational capabilities, they are added to the capability registry 110 for access by the capability set service component 108.

Once an issue data object has been generated by the issue manager 102 for a respective issue workflow and an operational capability set has been selected for the respective issue data object via an interactive issue creation interface, the issue workflow manager 106 directs an issue type identification service component 112 to automatically determine the issue's type and generate a corresponding issue type identifier based on the selected operational capability set. The issue type identification service component 112 comprises static rules, heuristics, and learned knowledge from past issue workflows with which to analyze the selected operational capability set. The learned knowledge comprises prior rankings and relevance scores for one or more operational capability sets stored in the capability registry 110, as well as data related to past issue workflows comprising respective issue data objects and metadata related to the past issue workflows stored in the data store 104. In preferred embodiments, the analysis of the selected operational capability set performed by the issue type identification service component 112 results in a classification of the issue's type such that an issue type identifier is determined and associated with the issue's corresponding issue data object. Once the issue type identification service component 112 determines the issue's type, the issue workflow manager 106 updates, by way of the issue manager 102, the metadata of the issue's corresponding issue data object in the data store 104.

In one or more embodiments, a predictive machine learning model of the issue management system 101 works in conjunction with the issue type identification service component 112 and the capability set service component 108. In various embodiments, the predictive machine learning model can use the learned knowledge of the issue type identification service component 112 as part of a training data set and, once trained, the machine learning model can predict or recommend an issue type identifier upon creation of a new issue data object based on said learned knowledge. The issue workflow manager 106, by way of the issue manager 102, can then update the metadata associated with the new issue data object with the recommended issue type identifier in the data store 104.

In various embodiments, the issue management system 101 adapts over time and the predictive machine learning model, by way of the capability set service component 108, can rank, filter, and calculate a relevance score for each of the one or more operational capability sets in the capability registry 110 based on the historical usage of the respective operational capability sets. For example, if a personnel connection such as "assignee" has historically been selected more often than "responder," the predictive machine learning model may rank the assignee personnel connection higher than the responder personnel connection, and, as such, the issue workflow manager 106 will present the assignee personnel connection in a more prominent position on the interactive issue creation interface when displaying the set of relevant operational capabilities. In various embodiments, the predictive machine learning model, by way of the capability set service component 108, can filter out unused capabilities entirely such that the issue workflow manager 106 doesn't present the unused capability on the interactive issue creation interface. Additionally, in one or more embodiments, the predictive machine learning model can be iteratively updated such that the more the issue management system 101 is employed, the more accurate and efficient the issue management system 101 becomes. For example, the more issue workflows that are created and the corresponding issue data objects are stored in data store 104, and the more operational capability sets that are selected, ranked and scored for relevance by the capability set service component 108 and stored in the capability registry 110, the larger the training data set for the predictive machine learning model will be.

Figure 2:
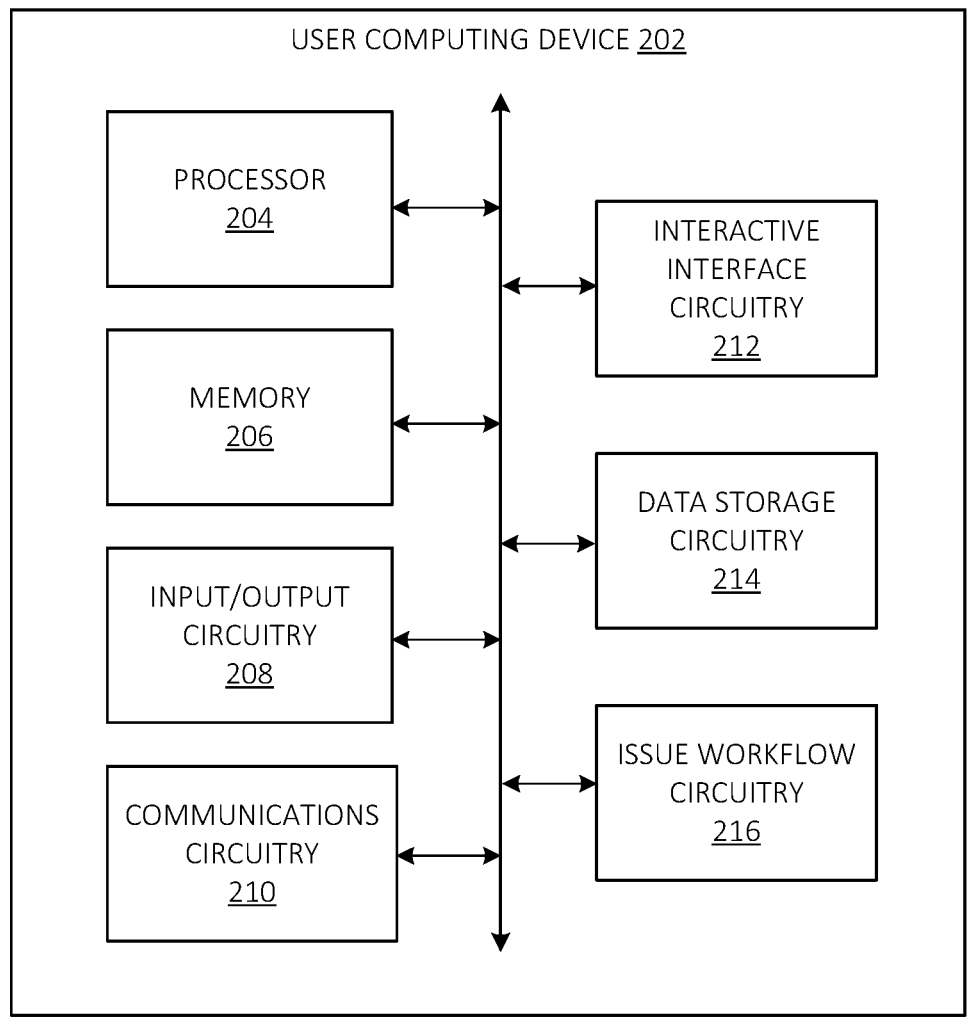
FIG. 2 is a block diagram of an exemplary user computing device structured in accordance with one or more embodiments of the present disclosure.

FIG. 2 illustrates a block diagram 200 of an example apparatus according to one or more described features of one or more embodiments of the disclosure. Specifically, the block diagram 200 includes a user computing device 202 to provide a practical application of adaptive issue type identification for an issue associated with an issue data object related to an issue workflow in accordance with at least some example embodiments of the present disclosure. In some embodiments, the issue management system 101 can be integrated with, or embodied by, one or more devices such as the user computing device 202 as depicted and described in FIG. 2. Additionally, in one or more embodiments, the user computing device 202 can be integrated with, or embodied by, an adaptive issue type rendering system (e.g., adaptive issue type rendering system 303 as detailed in FIG. 3 herein below).

The user computing device 202 includes processor 204, memory 206, input/output circuitry 208, communications circuitry 210, interactive interface circuitry 212, data storage circuitry 214, and/or issue workflow circuitry 216. In some embodiments, the user computing device 202 is configured, using one or more of the sets of circuitry 204, 206, 208, 210, 212, 214, and/or 216, to execute and perform the operations described herein.

In general, the terms computing device, system, entity, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the user computing device 202 embodies a particular, specially configured computing system transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the user computing device 202 provide or supplement the functionality of another particular set of circuitry. For example, the processor 204 in some embodiments provides processing functionality to any of the sets of circuitry, the memory 206 provides storage functionality to any of the sets of circuitry, the communications circuitry 210 provides network interface functionality to any of the sets of circuitry, and/or the like.

In some embodiments, the processor 204 (and/or co-processor or any other processing circuitry assisting or otherwise associated with the processor) is/are in communication with the memory 206 via a bus for passing information among components of the apparatus 200. In some embodiments, for example, the memory 206 is non-transitory and may include, for example, one or more volatile and/or non-volatile memories. In other words, for example, the memory 206 in some embodiments includes or embodies an electronic storage device (e.g., a computer readable storage medium). In some embodiments, the memory 206 is configured to store information, data, content, applications, instructions, or the like, for enabling the apparatus 200 to carry out various functions in accordance with example embodiments of the present disclosure.

The processor 204 may be embodied in a number of different ways. For example, in some example embodiments, the processor 204 includes one or more processing devices configured to perform independently. Additionally or alternatively, in some embodiments, the processor 204 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the user computing device 202, and/or one or more remote or "cloud" processor(s) external to the user computing device 202.

In an example embodiment, the processor 204 is configured to execute instructions stored in the memory 206 or otherwise accessible to the processor. Alternatively or additionally, the processor 204 in some embodiments is configured to execute hard-coded functionality. As such, whether configured by hardware or software methods, or by a combination thereof, the processor 204 represents an entity (e.g., physically embodied in circuitry) capable of performing operations according to an embodiment of the present disclosure while configured accordingly. Alternatively or additionally, as another example in some example embodiments, when the processor 204 is embodied as an executor of software instructions, the instructions specifically configure the processor 204 to perform the algorithms embodied in the specific operations described herein when such instructions are executed.

As one particular example embodiment, the processor 204 is configured to perform various operations associated with adaptive issue type identification. In some embodiments, the processor 204 includes hardware, software, firmware, and/or a combination thereof, that generates, stores, and/or maintains an issue data object associated with a particular issue workflow managed by an issue management system 101. Additionally or alternatively the processor 204 includes hardware, software, firmware, and/or a combination thereof, that determines an issue type identifier, as well as any other related metadata, for an issue data object associated with a particular issue workflow managed by issue management system 101.

The user computing device 202 includes input/output circuitry 208 that provides output to the user and, in some embodiments, to receive an indication of a user input. In some embodiments, the input/output circuitry 208 is in communication with the processor 204 to provide such functionality. The input/output circuitry 208 may comprise one or more user interface(s) and in some embodiments includes a display that comprises the interface(s) rendered as a web user interface, an application user interface, a user device, a backend system, or the like. In some embodiments, the input/output circuitry 208 also includes a keyboard, a mouse, a joystick, a touch screen, touch areas, soft keys a microphone, a speaker, or other input/output mechanisms. The processor 204 and/or input/output circuitry 208 comprising the processor may be configured to control one or more functions of one or more user interface elements through computer program instructions (e.g., software and/or firmware) stored on a memory accessible to the processor (e.g., memory 206, and/or the like). In some embodiments, the input/output circuitry 208 includes or utilizes a user-facing application to provide input/output functionality to a user computing device and/or other display associated with a user.

The user computing device 202 also includes communications circuitry 210. The communications circuitry 210 includes any means such as a device or circuitry embodied in either hardware or a combination of hardware and software that is configured to receive and/or transmit data from/to a network and/or any other device, circuitry, or module in communication with the user computing device 202. In this regard, in some embodiments the communications circuitry 210 includes, for example, a network interface for enabling communications with a wired or wireless communications network. Additionally or alternatively in some embodiments, the communications circuitry 210 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 210 includes circuitry for interacting with the antenna(s) and/or other hardware or software to cause transmission of signals via the antenna(s) or to handle receipt of signals received via the antenna(s). In some embodiments, the communications circuitry 210 enables transmission to and/or receipt of data from various components of an issue management system 101 and/or another external device in communication with the user computing device 202.

The interactive interface circuitry 212 includes hardware, software, firmware, and/or a combination thereof, that supports operation(s) facilitated in whole or in part via interaction with an interactive interface integrated with, or embodied by, a user computing device (e.g., interactive issue creation interface 304 and issue management capability selection interface 306 in FIG. 3 detailed herein below). In some embodiments, the interactive interface circuitry 212 includes hardware, software, firmware, and/or any combination thereof, that processes request(s) to perform operations associated with a particular issue workflow managed by an issue management system 101 including, but not limited to, generating a new issue data object associated with the issue workflow and/or selecting a relevant operational capability set related to said issue data object. In some embodiments, interactive interface circuitry 212 includes a separate processor, specially configured field programmable gate array (FPGA), or a specially programmed application specific integrated circuit (ASIC).

The data storage circuitry 214 includes hardware, software, firmware, and/or a combination thereof, that supports functionality for generating, storing, and/or maintaining one or more issue data objects associated with one or more respective issue workflows managed by issue management system 101. For example, in some embodiments, the data storage circuitry 214 includes hardware, software, firmware, and/or a combination thereof, that stores one or more issue data objects and metadata related to the one or more issue data objects associated with a particular user computing device (e.g., user computing device 202 in the adaptive issue type rendering system 303 in FIG. 3 as detailed herein below) in a data store 104. In some embodiments, the data storage circuitry 214 can be integrated with, or embodied by, the data store 104. Additionally or alternatively, the data storage circuitry 214 includes hardware, software, firmware, and/or a combination thereof, that stores and maintains one or more operational capability sets in a capability registry 110. In some embodiments, the data storage circuitry 214 can be integrated with, or embodied by, the capability registry 110. In some embodiments, the data storage circuitry 214 includes a separate processor, specially configured field programmable gate array (FPGA), or a specially programmed application specific integrated circuit (ASIC).

The issue workflow circuitry 216 includes hardware, software, firmware, and/or a combination thereof, that performs one or more adaptive issue type identification process(es) related to an issue workflow, i.e., the lifecycle of an issue and the necessary steps to document and manage the issue and the issue's associated issue data object. In one or more embodiments, the issue workflow comprises an issue data object's creation and type identification, as well as data related to the resolution of the associated issue. In one or more embodiments, the issue workflow circuitry 216 includes hardware, software, firmware, and/or a combination thereof, that performs one or more adaptive issue type identification operations as directed by an issue manager 102 and/or an issue workflow manager 106. For example, in some embodiments, the issue workflow circuitry 216 includes hardware, software, firmware, and/or a combination thereof, that can cause the issue manager 102 to generate a new issue data object based on a request generated via a user computing device (e.g., user computing device 202 of the adaptive issue type rendering system 303 in FIG. 3 as detailed herein below), and subsequently store said issue data object in the data store 104. In another example, the issue workflow circuitry 216 includes hardware, software, firmware, and/or a combination thereof, that can cause the issue workflow manager 106 to facilitate the fetching, updating, and storing of metadata associated with one or more issue data objects. Additionally or alternatively, the issue workflow circuitry 216 includes hardware, software, firmware, and/or a combination thereof, that can cause the issue workflow manager 106 to, by way of the capability set service component 108, associate an operational capability set with an issue data object. Additionally or alternatively, the issue workflow circuitry 216 includes hardware, software, firmware, and/or a combination thereof, that can cause the issue workflow manager 106 to, by way of the issue type identification service component 112, can associate an issue type identifier with an issue data object. In some embodiments, the issue workflow circuitry 216 includes a separate processor, specially configured field programmable gate array (FPGA), or a specially programmed application specific integrated circuit (ASIC).

Additionally or alternatively, in some embodiments, two or more of the sets of circuitries 204-216 are combinable. Additionally or alternatively, in some embodiments, one or more of the sets of circuitry perform some or all of the functionality described associated with another component. For example, in some embodiments, two or more of the sets of circuitry 204-216 are combined into a single module embodied in hardware, software, firmware, and/or a combination thereof. Similarly, in some embodiments, one or more of the sets of circuitry, for example the interactive interface circuitry 212, data storage circuitry 214, and/or issue workflow circuitry 216, is/are combined with the processor 204, such that the processor 204 performs one or more of the operations described above with respect to each of these sets of circuitry 212-216.

Figure 3:
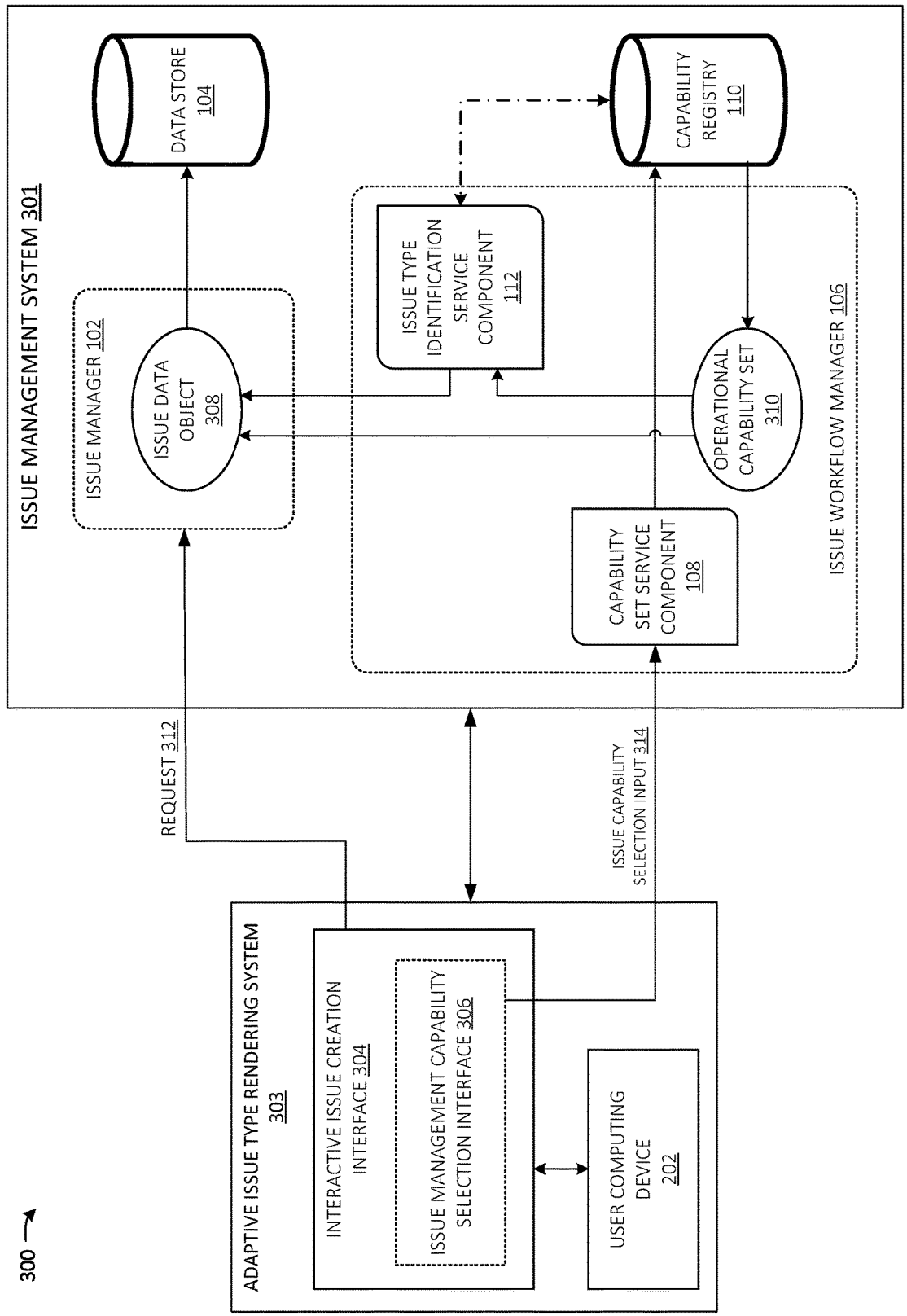
FIG. 3 is a block diagram of another exemplary adaptive issue type identification platform architecture configured for adaptive issue type identification in accordance with one or more embodiments of the present disclosure.

FIG. 3 illustrates another exemplary adaptive issue type identification platform architecture 300 for performing adaptive issue type identification according to one or more described features of one or more embodiments of the disclosure. Specifically, FIG. 3 depicts data interactions between an adaptive issue type rendering system 303 and an issue management system 301.

The adaptive issue type rendering system 303 and the issue management system 301 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Web Socket channel. In some embodiments, the protocol is JSON over RPC, JSON over REST/HTTP, and the like.

In one or more embodiments, the adaptive issue type rendering system 303 includes the user computing device 202 to facilitate the rendering of the interactive issue creation interface 304 and the issue management capability selection interface 306 generated by the issue management system 301. In various embodiments, the issue management capability selection interface 306 can integrate with, or be embodied by, the interactive issue creation interface 304. In one or more embodiments, the interactive issue creation interface 304 and the issue management capability selection interface 306 are rendered via the interactive interface circuitry 212 of the user computing device 202. Additionally or alternatively, the interactive issue creation interface 304 and the issue management capability selection interface 306 can be rendered by the input/output circuitry 210, and/or a combination of the input/output circuitry 210 the interactive interface circuitry 212 of the user computing device 202.

The interactive issue creation interface 304 is associated with an interactive dashboard visualization comprising a plurality of interactive display elements associated with one or more respective components of the issue management system such that an interaction with the one or more interactive display elements can cause the issue management system to receive and execute various commands. In various embodiments, the interactive display elements can include, but are not limited to, interactive buttons, hyperlinks, text, graphs, charts, tables, matrices, and/or images associated with one or more portions of executable code related to an issue management system (e.g., issue management system 301) and executable by a user computing device(s) 202.

In various embodiments, the adaptive issue type rendering system 303, by way of the interactive issue creation interface 304, can generate a request 312 to initialize an issue data object 308 associated with an issue workflow. For example, the adaptive issue type rendering system 303 can generate the request 312 based on a user interaction with the interactive issue creation interface 304 (e.g., such as by the input/output circuitry 208, communications circuitry 210, interactive interface circuitry 212, and/or any combination thereof in user computing device 202) and transmit the request 312 to the issue manager 102. Upon receiving the request 312, the issue manager 102 can generate a new issue data object 308 and store the issue data object 308 in data store 104.

In one or more embodiments, the issue management capability selection interface 306 is associated with an interactive dashboard visualization comprising a plurality of interactive display elements associated with one or more respective components of the issue management system such that an interaction with the one or more interactive display elements can cause the issue management system to receive and execute various commands. In various embodiments, the interactive display elements can include, but are not limited to, interactive buttons, hyperlinks, text, graphs, charts, tables, matrices, and/or images associated with one or more portions of executable code related to an issue management system (e.g., issue management system 301) and executable by a user computing device(s) 202. Additionally or alternatively, in various embodiments, the issue management capability selection interface 306 can be configured to display a plurality of interactive operational capability components, where the interactive operational capability components are an interactive, visual representation of one or more operational capabilities stored in the capability registry 110.

In various embodiments, the adaptive issue type rendering system 303 can generate issue capability selection input 314 based on a user engagement with one or more interactive operational capability components configured on the issue management capability selection interface 306. The one or more interactive operational capability components can represent one or more respective operational capabilities provided by the capability registry 110, and the issue capability selection input 314 comprises a selection indication of one or more operational capabilities. Additionally or alternatively, in various embodiments, the issue capability selection input 314 can comprise a description of the issue related to the issue data object 308 rather than an explicit selection of potentially relevant operational capabilities. The adaptive issue type rendering system 303 can transmit the issue capability selection input 314 to the issue workflow manager 106. The issue workflow manager 106 can then employ the capability set service component 108 to fetch an operational capability set 310 from the capability registry 110 based on the issue capability selection input 314.

In various embodiments, when an issue data object (e.g., issue data object 308) is created, the capability set service component 108 can fetch the operational capability set 310 out of one or more operational capability sets in the capability registry 110 based on the relevance score and/or rank of the one or more respective operational capability sets. For example, the capability set service component 108 can calculate a relevance score and/or rank for each of the one or more operational capability sets in the capability registry 110 based on the issue capability selection input 314 and subsequently fetch an operational capability set 310 based on the relevance score and/or rank of the operational capability set 310. Additionally or alternatively, the capability set service component 108 can compute relevance scores and/or ranks for each of the one or more operational capability sets in the capability registry 110 based on the historical usage of the respective one or more operational capability sets and subsequently fetch an operational capability set 310 from the capability registry 110 based on the historical relevance and/or rank of the operational capability set 310. As such, the relevance of the operational capability sets in the capability registry 110 associated with an issue management system 301 related to a particular user and/or organization may only be relevant to that particular user and/or organization. Thus, embodiments of the present disclosure can adapt to the preferences and patterns of individual users and/or organizations. Once fetched, the issue workflow manager 106 can associate the operational capability set 310 with the issue data object 308 by updating, through collaboration with the issue manager 102, the metadata associated with the issue data object 308.

The issue workflow manager 106 can also transmit the operational capability set 310 to the issue type identification service component 112. In various embodiments, the issue type identification service component 112 can automatically determine an issue type identifier for the issue data object 308 based on an analysis of the operational capability set 310. For this purpose, the issue type identification service component 112 comprises static rules, heuristics, and learned knowledge with which to analyze the operational capability set 310. The learned knowledge comprised in the issue type identification service component 112 comprises prior rankings and relevance scores for one or more operational capability sets stored in a capability registry 110, as well as data related to past issue workflows and the respective issue data objects and metadata related to the past issue workflows. The issue workflow manager 106 can fetch, update, and store data related to the learned knowledge comprised in the issue type identification service component 112. In preferred embodiments, the analysis of the operational capability set 310 performed by the issue type identification service component 112 results in a classification of an issue's type such that an issue type identifier is determined and associated with the issue's corresponding issue data object (e.g., issue data object 308). Once the issue type identification service component 112 determines the issue type identifier, the issue workflow manager 106 updates, by way of the issue manager 102, the metadata of the issue's corresponding issue data object 308 in the data store 104.

EXAMPLE PROCESSES OF THE DISCLOSURE

Having described example systems and apparatuses, data environments, data flows, and data architectures in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Similarly, it should be appreciated that one or more of the operations of each flowchart may be combinable, replaceable, and/or otherwise altered as described herein.

Figure 4:
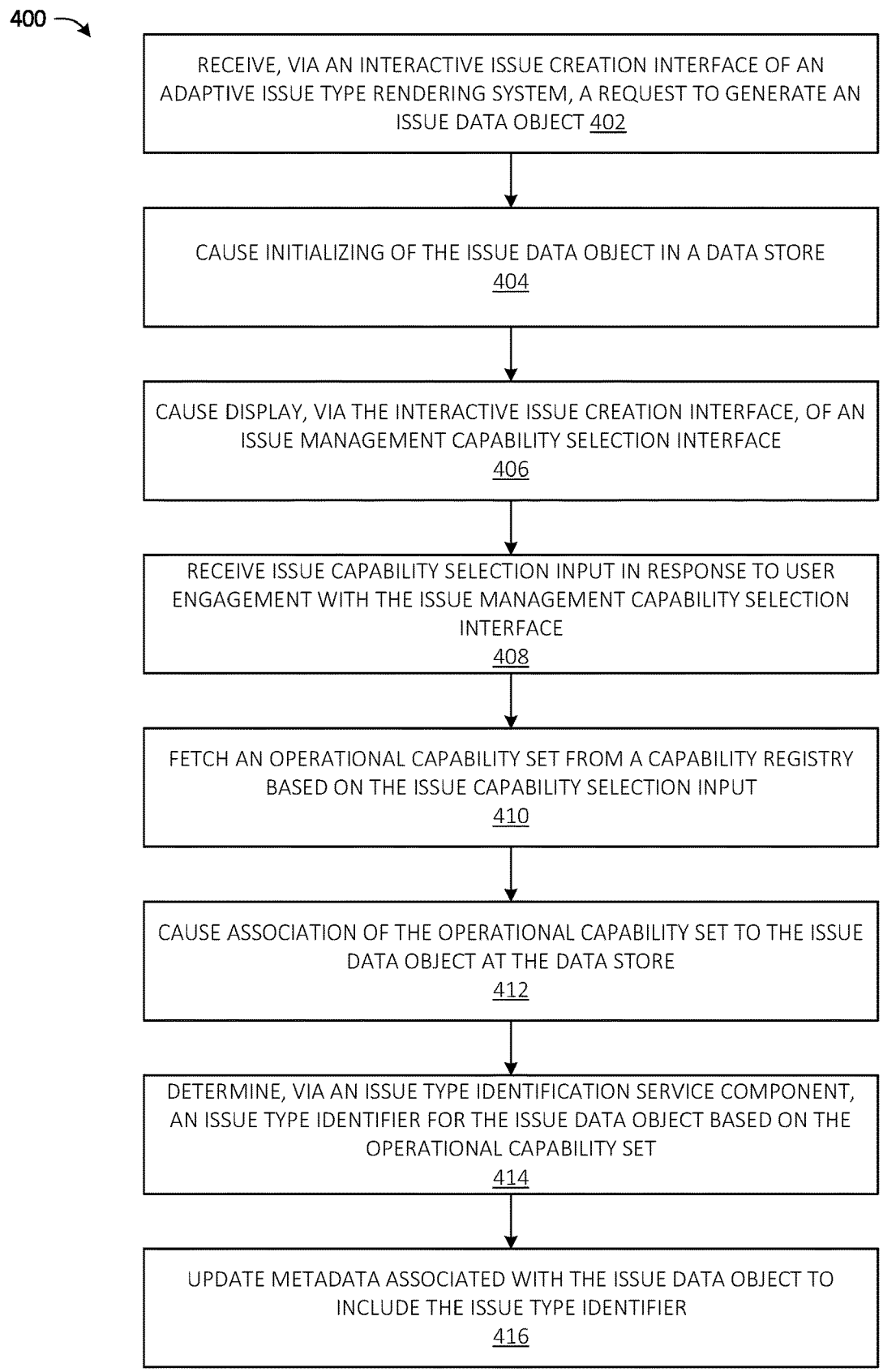
FIG. 4 illustrates a flowchart representing a process 400 for adaptively identifying an issue type in accordance with one or more embodiments of the present disclosure.

FIG. 4 illustrates a flowchart representing a process 400 for performing adaptive issue type identification in accordance with at least some embodiments of the present disclosure. In some embodiments, the process 400 is embodied by computer program code stored on a non-transitory computer-readable storage medium of a computer program product configured for execution to perform the process as depicted and described. Additionally or alternatively, in some embodiments, the process 400 is performed by one or more specially configured computing devices, such as the user computing device 202 alone or in communication with one or more other component(s), device(s), and/or system(s) (e.g., adaptive issue type rendering system 303). In this regard, in some such embodiments, the user computing device 202 is specially configured by computer-coded instructions (e.g., computer program instructions) stored thereon, for example in the memory 206 and/or another component depicted and/or described herein and/or otherwise accessible to the user computing device 202, for performing the operations as depicted and described. In some embodiments, the user computing device 202 is in communication with one or more external apparatus(es), system(s), device(s), and/or the like, to perform one or more of the operations as depicted and described. For example, the user computing device 202 in some embodiments is in communication with one or more system(s) integrated with, or embodying, an adaptive issue type identification platform (e.g., user computing device 202 embodied by adaptive issue type rendering system 303 and integrated with issue management system 301). For purposes of simplifying the description, the process 400 is described as performed by and from the perspective of the user computing device 202.

The process 400 begins at operation 402. At operation 402, the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that receives, via an interactive issue creation interface of an adaptive issue type rendering system, a request to generate an issue data object. In one or more embodiments, the interactive issue creation interface can be rendered on a user computing device associated with an adaptive issue type rendering system integrated with the issue management system (e.g., interactive issue creation interface 304 rendered on user computing device 202 of adaptive issue type rendering system 303 integrated with issue management system 301) and configured to generate a request (e.g., request 312). The request 312 can be generated by an engagement with one or more interactive display elements configured on the interactive issue creation interface 304 rendered on the user computing device 202 associated with the adaptive issue type rendering system 303. In various embodiments, the interactive display elements can include, but are not limited to, interactive buttons, hyperlinks, text, graphs, charts, tables, matrices, and/or images associated with one or more portions of executable code related to an issue management system (e.g., issue management system 301) and executable by the user computing device 202. Additionally or alternatively, the request 312 can be transmitted to the issue management system 301 remotely, for example, by the communications circuitry 208 of one or more user computing device(s) 202.

At operation 404, the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that causes initializing of an issue data object in a data store. In various embodiments, an issue manager (e.g., issue manager 102) of the issue management system 301 can generate a new issue data object (e.g., issue data object 308) based on a request received by a user interaction with an interactive issue creation interface (e.g., request 312 generated by adaptive issue type rendering system 303 based on a user interaction with interactive issue creation interface 304). In response to the request 312, the issue manager 102 can generate the issue data object 308 and store the issue data object 308 in a data store (e.g., data store 104).

In various embodiments, the issue data object 308 is associated with a generic type upon creation such that any metadata associated with the issue data object 308 (such as the issue data object's issue type identifier and/or any metadata related to the issue data object's associated operational capability set) are assigned placeholder values. Additionally or alternatively, in one or more embodiments, a generically-typed issue data object 308 can be associated with a predefined set of operational capabilities based on preferences defined in a user computing device 202. Additionally or alternatively, in various embodiments, once the issue data object 308 is generated, the issue workflow manager 106, by way of the issue manager 102, can automatically associate issue type identifier metadata and operational capability set metadata to the issue data object 308 based on historical usage data related to the user computing device 202. For example, metadata associated with the issue data object 308 can automatically be initialized based on the learned knowledge comprised in the issue type identification service component 112, where said learned knowledge comprises prior rankings and relevance scores for one or more operational capability sets stored in a capability registry 110, as well as data related to past issue workflows and the respective issue data objects and metadata related to the past issue workflows.

At operation 406, the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that causes display, via the interactive issue creation interface, of an issue management capability selection interface. In one or more embodiments, the issue management capability selection interface 306 can integrate with, or be embodied by, the interactive issue creation interface 304 and be rendered on a user computing device 202. The issue management capability selection interface 306 can be configured to display a plurality of interactive operational capability components, where the interactive operational capability components are an interactive, visual representation of one or more operational capabilities stored in the capability registry 110.

In one or embodiments, when an issue data object 308 is created (e.g., such as at operation 404), the issue management capability selection interface 306 can be configured to display one or more interactive operational capability components associated with one or more operational capabilities based on the relevance scores and ranks of the one or more operational capabilities. In various embodiments, interactive operational capability components associated with operational capabilities with higher relevance scores and ranks will be positioned on the issue management capability selection interface 306 in places of higher prominence. In such embodiments, the relevance scores and ranks of the operational capabilities can be derived based on the historical usage of said operational capabilities by a user computing device system(s) 202 integrated with an issue management system 301. Additionally or alternatively, the issue management capability selection interface 306 can be configured to display one or more interactive operational capability components associated with one or more operational capabilities based on a generically-typed issue data object 308. For example, the one or more interactive operational capability components can be displayed based on a predefined set of operational capabilities associated with a generically-typed issue data object 308.

At operation 408, the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that receives issue capability selection input in response to user engagement with the issue management capability selection interface. For instance, the issue workflow manager 106 can be configured to receive issue capability selection input 314 generated by the adaptive issue type rendering system 303 in response to a user interaction with issue management capability selection interface 306. In various embodiments, the issue management capability selection interface 306 can generate issue capability selection input 314 based on an engagement with one or more interactive operational capability components configured on the issue management capability selection interface 306. In one or more embodiments, the issue capability selection input 314 comprises a selection indication of one or more interactive operational capability components associated with one or more operational capabilities. Additionally or alternatively, in various embodiments, the issue capability selection input 314 can comprise a description of the issue related to the issue data object 308 rather than an explicit selection of potentially relevant operational capabilities.

At operation 410, the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that fetches an operational capability set from a capability registry based on the issue capability selection input. For example, the issue workflow manager 106 can employ the capability set service component 108 to fetch an operational capability set 310 from the capability registry 110 based on the issue capability selection input 314. In various embodiments, the capability set service component 108 can fetch the operational capability set 310 out of one or more operational capability sets in the capability registry 110 based on the relevance score and/or rank of the one or more respective operational capability sets. In one or more embodiments, the issue workflow manager 106 can present the operational capability set 310 on the issue management capability selection interface 306 for approval by the user computing device 202. In various embodiments, a user engagement with the operational capability set 310 via the issue management capability selection interface 306 can cause the issue workflow manager 106 to add to, edit, reject, and/or update the operational capability set 310.

At operation 412 the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that causes association of the operational capability set to the issue data object at the data store. In various embodiments, the issue workflow manager 106 can associate the operational capability set 310 with the issue data object 308 by updating, through collaboration with the issue manager 102, the metadata associated with the issue data object 308 stored in data store 104.

At operation 414 the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that determines, via an issue type identification service component, an issue type identifier for the issue data object based on the operational capability set. For example, the issue workflow manager 106 can transmit the operational capability set 310 to the issue type identification service component 112. In various embodiments, the issue type identification service component 112 can automatically determine an issue type identifier for the issue data object 308 based on an analysis of the operational capability set 310. For this purpose, the issue type identification service component 112 comprises static rules, heuristics, and learned knowledge with which to analyze the operational capability set 310. The learned knowledge comprised in the issue type identification service component 112 comprises prior rankings and relevance scores for one or more operational capability sets stored in a capability registry 110, as well as data related to past issue workflows and the respective issue data objects and metadata related to the past issue workflows. The issue workflow manager 106 can be configured to fetch, update, and store data related to the learned knowledge comprised in the issue type identification service component 112. In preferred embodiments, the analysis of the operational capability set 310 performed by the issue type identification service component 112 results in a classification of an issue's type such that an issue type identifier is determined and associated with the issue's corresponding issue data object (e.g., issue data object 308).

At operation 416 the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that updates metadata associated with the issue data object to include the issue type identifier. For example, once the issue type identification service component 112 determines the issue type identifier, the issue workflow manager 106 can update, by way of the issue manager 102, the metadata of the issue data object 308 stored in data store 104 to include the issue type identifier.

FIG. 5 illustrates a flowchart representing a process 500 for performing adaptive issue type identification in accordance with at least some embodiments of the present disclosure. Specifically, FIG. 5 depicts operations of an example process 500 for computing relevance scores and ranks for an operational capability set in accordance with some embodiments of the present disclosure. In some embodiments, the process 500 is embodied by computer program code stored on a non-transitory computer-readable storage medium of a computer program product configured for execution to perform the process as depicted and described. Alternatively or additionally, in some embodiments, the process 500 is performed by one or more specially configured computing devices, such as the user computing device 202 alone or in communication with one or more other component(s), device(s), system(s), and/or the like. In this regard, in some such embodiments, the user computing device 202 is specially configured by computer-coded instructions (e.g., computer program instructions) stored thereon, for example in the memory 206 and/or another component depicted and/or described herein and/or otherwise accessible to the user computing device 202, for performing the operations as depicted and described. In some embodiments, the user computing device 202 is in communication with one or more external apparatus(es), system(s), device(s), and/or the like, to perform one or more of the operations as depicted and described. For example, the user computing device 202 in some embodiments is in communication with one or more system(s) integrated with, or embodying, an adaptive issue type identification platform (e.g., user computing device 202 embodied by adaptive issue type rendering system 303 and integrated with issue management system 301). For purposes of simplifying the description, the process 500 is described as performed by and from the perspective of the user computing device 202.

The process 500 begins at operation 502. In some embodiments, the process 500 begins after one or more operations depicted and/or described with respect to any one of the other processes described herein. For example, in some embodiments as depicted, the process 500 begins before execution of operation 402. In this regard, some or all of the process 500 may replace or supplement one or more blocks depicted and/or described with respect to any of the processes described herein. Upon completion of the process 500, the flow of operations may terminate. Additionally or alternatively, as depicted, upon completion of the process 500 in some embodiments, flow may return to one or more operation(s) of another process, such as the operation 402. It will be appreciated that, in some embodiments, the process 500 embodies a sub-process of one or more other process(es) depicted and/or described herein, for example the process 400.

At operation 502 the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that computes, via a capability set service component, relevance scores for one or more operational capability sets stored in the capability registry, where the relevance scores are based in part on historical usage of the respective one or more operational capability sets. For example, the capability set service component 108 can compute relevance scores for each of the one or more operational capability sets in the capability registry 110 based, in part, on the historical usage of each of the one or more respective operational capability sets. For instance, if an operational capability set comprising a workforce collaboration tool to create timelines has historically been selected more often than an operational capability set comprising a collaboration tool to create alerts, the capability set service component 108 may assign a higher relevance score to the timeline creation tool respective to the alert creation tool. In various embodiments, the issue workflow manager 106 can cause the adaptive issue type rendering system 303 to configure the issue management capability selection interface 306 such that operational capability sets with higher respective relevance scores can be positioned in places of higher prominence than operational capability sets with lower respective relevance scores.

At operation 504 the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that ranks, based on the relevance scores, each of the one or more operational capability sets such that operational capability sets with a higher respective relevance score are ranked higher than operational capability sets with a lower respective relevance score. For example, the capability set service component 108 can rank each of the one or more operational capability sets in the capability registry 110 based on the respective relevance scores of the one or more operational capability sets. In various embodiments, the issue workflow manager 106 can cause the adaptive issue type rendering system 303 to configure the issue management capability selection interface 306 such that operational capability sets with higher respective rankings can be positioned in places of higher prominence than operational capability sets with lower respective rankings.

At operation 506 the user computing device 202 includes means, such as the interactive interface circuitry 212, data storage circuitry 214, issue workflow circuitry 216, communications circuitry 210, input/output circuitry 208, memory 206, and/or processor 204, or any combination thereof, that stores, in the capability registry, the relevance scores and ranks of the one or more operational capability sets. For example, the capability set service component 108 can store and/or update metadata related to the respective relevance scores and ranks of the one or more operational capability sets in the capability registry 110. Additionally or alternatively, the capability set service component 108 can filter and/or organize the one or more operational capability sets in the capability registry 110 such that when the operational capability sets are fetched by the issue workflow manager 106 from the capability registry 110, only relevant operational capability sets are made available.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML, page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method for managing an issue workflow in an issue management system, the method comprising:
   receiving, from an adaptive issue type rendering system, a request to generate an issue data object, wherein the request is generated in response to an interaction with an interactive issue creation interface;
   causing initializing of the issue data object in a data store;
   causing display, via the interactive issue creation interface, of an issue management capability selection interface;
   receiving issue capability selection input in response to user engagement with the issue management capability selection interface; and
   in response to receiving the issue capability selection input:
      fetching an operational capability set from a capability registry based on the issue capability selection input;
      causing association of the operational capability set to the issue data object at the data store;
      determining, via an issue type identification service component, an issue type identifier for the issue data object based on the operational capability set; and
      updating metadata associated with the issue data object to include the issue type identifier.

2. The computer-implemented method of claim 1, the method further comprising:
   computing, via a capability set service component, relevance scores for one or more operational capability sets stored in the capability registry, wherein the relevance scores are based in part on historical usage of the respective one or more operational capability sets;
   ranking, based on the relevance scores, each of the one or more operational capability sets such that operational capability sets with a higher respective relevance score are displayed on the issue management capability selection interface in a position of higher prominence relative to the operational capability sets with lower respective relevance scores; and
   storing, in the capability registry, the relevance scores and ranks of the one or more operational capability sets.

3. The computer-implemented method of claim 1, wherein the capability registry comprises one or more operational capability sets, wherein the one or more operational capability sets comprise one or more operational capabilities, and wherein the one or more operational capabilities can be one of at least:
   a personnel connection to the issue data object, an issue classification label associated with the issue data object, or a workforce collaboration tool interfaced by the issue management system.

4. The computer-implemented method of claim 2, wherein the issue type identification service component employs static rules, heuristics, and learned knowledge to determine the issue type identifier for the issue data object based on the operational capability set,
   wherein the learned knowledge comprises prior rankings and relevance scores for the operational capability sets stored in the capability registry, as well as metadata associated with one or more past issue data objects stored in the data store.

5. The computer-implemented method of claim 4, wherein the issue management system further comprises a predictive machine learning model derived from a training dataset, and wherein the predictive machine learning model works in conjunction with the issue type identification service component and the capability set service component.

6. The computer-implemented method of claim 5, wherein the predictive machine learning model employs the learned knowledge of the issue type identification service component as a portion of the training data set, the computer-implemented method further comprising:
   predicting, via the predictive machine learning model, an issue type identifier upon generation of a new issue data object.

7. The computer-implemented method of claim 2, the method further comprising:
   filtering, via the capability set service component, historically unused operational capability sets such that the historically unused operational capability sets are not displayed on the issue management capability selection interface.

8. The computer-implemented method of claim 1, wherein the issue management capability selection interface comprises a plurality of interactive operational capability components, wherein the interactive operational capability components are a visual representation of one or more operational capabilities, and wherein receiving the issue capability selection input further comprises:
   receiving a selection indication associated with one or more interactive operational capability components.

9. An apparatus for managing an issue workflow in an issue management system, the apparatus comprising:
   at least one processor; and
   at least one memory storing instructions that, when executed by the at least one processor, cause the apparatus to:
   receive, from an adaptive issue type rendering system, a request to generate an issue data object, wherein the request is generated in response to an interaction with an interactive issue creation interface;
   cause initializing of the issue data object in a data store;
   cause display, via the interactive issue creation interface, of an issue management capability selection interface;
   receive issue capability selection input in response to user engagement with the issue management capability selection interface; and
   in response to receiving the issue capability selection input:
      fetch an operational capability set from a capability registry based on the issue capability selection input;
      cause association of the operational capability set to the issue data object at the data store;
      determine, via an issue type identification service component, an issue type identifier for the issue data object based on the operational capability set; and
      update metadata associated with the issue data object to include the issue type identifier.

10. The apparatus of claim 9, wherein the instructions further cause the apparatus to:
    compute, via a capability set service component, relevance scores for one or more operational capability sets stored in the capability registry, wherein the relevance scores are based in part on historical usage of the respective one or more operational capability sets;
    rank, based on the relevance scores, each of the one or more operational capability sets such that operational capability sets with a higher respective relevance score are displayed on the issue management capability selection interface in a position of higher prominence relative to the operational capability sets with lower respective relevance scores; and store, in the capability registry, the relevance scores and ranks of the one or more operational capability sets.

11. The apparatus of claim 9, wherein the capability registry comprises one or more operational capability sets, wherein the one or more operational capability sets comprise one or more operational capabilities, and wherein the one or more operational capabilities can be one of at least:
a personnel connection to the issue data object, an issue classification label associated with the issue data object, or a workforce collaboration tool interfaced by the issue management system.

12. The apparatus of claim 10, wherein the issue type identification service component employs static rules, heuristics, and learned knowledge to determine the issue type identifier for the issue data object based on the operational capability set,
wherein the learned knowledge comprises prior rankings and relevance scores for the operational capability sets stored in the capability registry, as well as metadata associated with one or more past issue data objects stored in the data store.

13. The apparatus of claim 12, wherein the issue management system further comprises a predictive machine learning model derived from a training dataset, and wherein the predictive machine learning model works in conjunction with the issue type identification service component and the capability set service component.

14. The apparatus of claim 13, wherein the predictive machine learning model employs the learned knowledge of the issue type identification service component as a portion of the training data set, and wherein the instructions further causing the apparatus to:
predict, via the predictive machine learning model, an issue type identifier upon generation of a new issue data object.

15. The apparatus of claim 10, wherein the instructions further cause the apparatus to:
filter, via the capability set service component, historically unused operational capability sets such that the historically unused operational capability sets are not displayed on the issue management capability selection interface.

16. The apparatus of claim 9, wherein the issue management capability selection interface comprises a plurality of interactive operational capability components, wherein the interactive operational capability components are a visual representation of one or more operational capabilities, and wherein the instructions to receive the issue capability selection input further cause the apparatus to:
receive a selection indication associated with one or more interactive operational capability components.

17. A non-transitory computer-readable storage medium for managing an issue workflow in an issue management system, the computer-readable storage medium including instructions that when executed by the at least one processor cause the at least one processor to:
receive, from an adaptive issue type rendering system, a request to generate an issue data object, wherein the request is generated in response to an interaction with an interactive issue creation interface;
cause initializing of the issue data object in a data store;
cause display, via the interactive issue creation interface, of an issue management capability selection interface;
receive issue capability selection input in response to user engagement with the issue management capability selection interface; and
in response to receiving the issue capability selection input:
fetch an operational capability set from a capability registry based on the issue capability selection input;
cause association of the operational capability set to the issue data object at the data store;
determine, via an issue type identification service component, an issue type identifier for the issue data object based on the operational capability set; and
update metadata associated with the issue data object to include the issue type identifier.

18. The non-transitory computer-readable storage medium of claim 17, wherein the instructions further cause the at least one processor to:
compute, via a capability set service component, relevance scores for one or more operational capability sets stored in the capability registry, wherein the relevance scores are based in part on historical usage of the respective one or more operational capability sets;
rank, based on the relevance scores, each of the one or more operational capability sets such that operational capability sets with a higher respective relevance score are displayed on the issue management capability selection interface in a position of higher prominence relative to the operational capability sets with lower respective relevance scores; and
store, in the capability registry, the relevance scores and ranks of the one or more operational capability sets.

19. The non-transitory computer-readable storage medium of claim 18, wherein the issue type identification service component employs static rules, heuristics, and learned knowledge to determine the issue type identifier for the issue data object based on the operational capability set,
wherein the learned knowledge comprises prior rankings and relevance scores for the operational capability sets stored in the capability registry, as well as metadata associated with one or more past issue data objects stored in the data store.

20. The non-transitory computer-readable storage medium of claim 19, wherein the issue management system further comprises a predictive machine learning model derived from a training dataset, wherein the predictive machine learning model employs the learned knowledge of the issue type identification service component as a portion of the training data set, and wherein the instructions further causing the apparatus to:
predict, via the predictive machine learning model, an issue type identifier upon generation of a new issue data object.

* * * * *